United States Patent [19]
Klein

[11] 3,927,179
[45] Dec. 16, 1975

[54] PROCESS FOR MANUFACTURING PHOSPHORUS OXYCHLORIDE

[75] Inventor: George I. Klein, Larchmont, N.Y.

[73] Assignee: Stauffer Chemical Company, New York, N.Y.

[22] Filed: Nov. 9, 1970

[21] Appl. No.: 88,099

Related U.S. Application Data

[63] Continuation of Ser. No. 702,650, Feb. 2, 1968, abandoned.

[52] U.S. Cl................................. 423/300; 423/304
[51] Int. Cl............................................. C01b 25/10
[58] Field of Search........... 23/203 R; 423/300, 301, 423/304

[56] References Cited
UNITED STATES PATENTS
1,921,370  8/1933  North............................... 23/203 R
3,167,577  1/1965  Malone............................. 23/165 X
3,406,013  10/1968 Muller-Schiedmayer et al. 23/203 R Primary Examiner—Earl C. Thomas

[57] ABSTRACT

A continuous process of manufacturing phosphorus oxychloride consisting essentially of introducing phosphorus trichloride into a reaction vessel along with phosphorus and an oxygen doning material to form phosphorus pentoxide in situ. Chlorine is then added to the phosphorus trichloride, phosphorus pentoxide mixture which react together to form phosphorus oxychloride.

8 Claims, 1 Drawing Figure

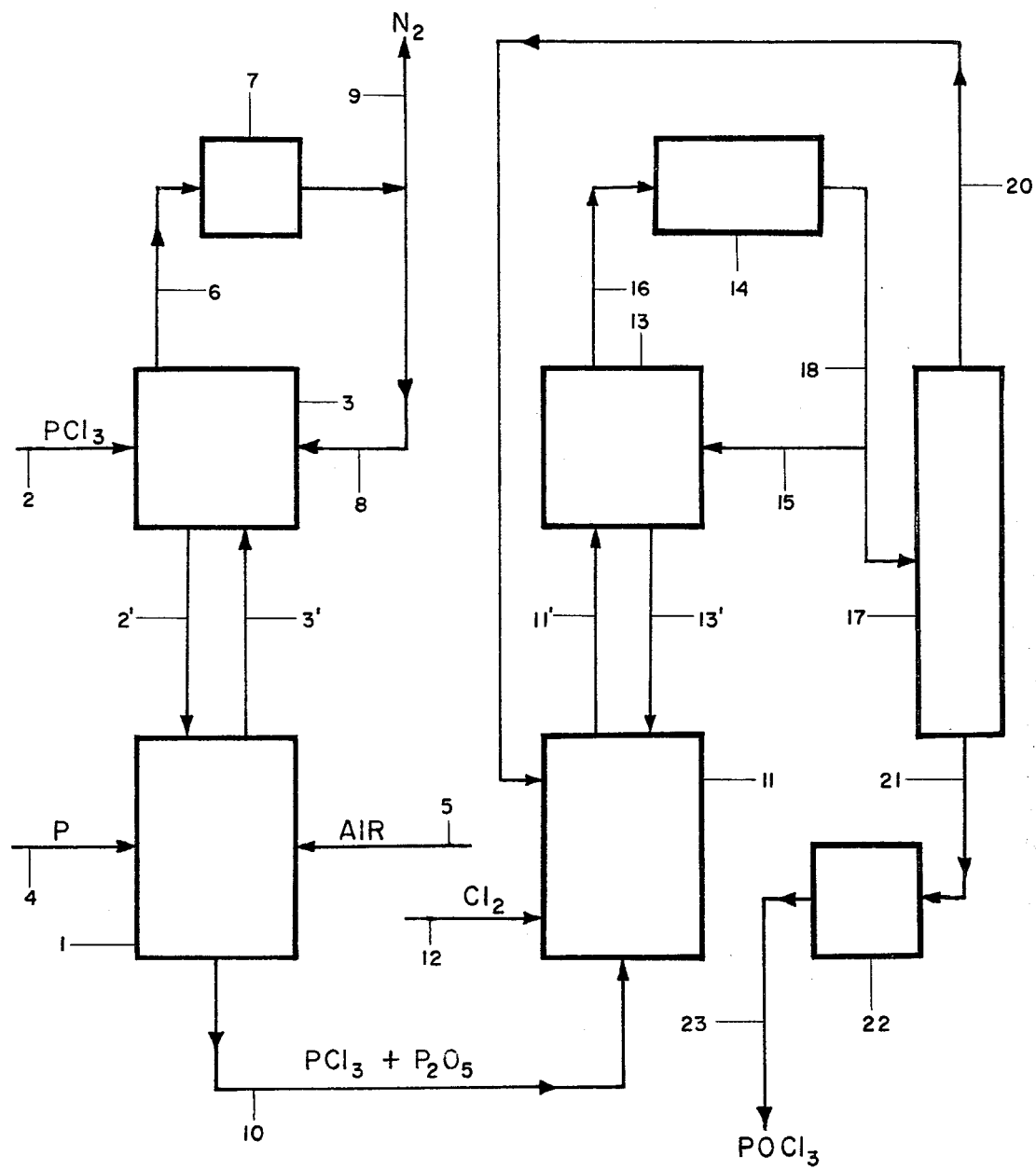

3,927,179

PROCESS FOR MANUFACTURING PHOSPHORUS OXYCHLORIDE

RELATED APPLICATION

This application is a continuation of application Ser. No. 702,650, filed Feb. 2, 1968 and now abandoned.

BACKGROUND OF THE INVENTION

Phosphorus oxychloride is a widely used reagent for many organic condensation reactions and finds particular application in the preparation of triphenyl and tricresyl phosphates, both of which are used as plasticizers for cellulose acetate, cellulose nitrate and for various resins.

Phosphorus oxychloride can be prepared by the oxidation of phosphorus trichloride. This method can be carried out by reacting phosphorus trichloride with sodium chlorate to yield the phosphorus oxychloride.

However, certain economic factors render this method unsuitable. The sodium chloride produced by the reaction always holds some phosphorus oxychloride and since the sodium chloride produced must be removed at stated intervals, there is a loss of the oxychloride. Also, the sodium chloride cakes readily and a powerful stirrer is required to prevent such caking. There is considerable abrasion and the apparatus does not last very long. Furthermore, the removal of sodium chloride is a very unpleasant operation which must be performed by operators wearing gas masks, as phosphorus oxychloride fumes produce intense lung and throat irritation.

In order to obviate the above procedure, it was proposed to react phosphorus pentachloride with phosphorus pentoxide to yield the phosphorus oxychloride. However, this reaction is of such violence that control, even with an excess of phosphorus oxychloride as a moderator, is very difficult. Moreover, the phosphorus pentachloride is a solid and is exceedingly corrosive and hard to handle.

Therefore, it has been proposed to oxidize phosphorus trichloride by adding chloride thereto in the presence of an oxygen bearing compound. To this end, phosphorus trichloride and phosphorus pentoxide in the proper proportions are mixed together. These materials did not react together until additional chloride is incorporated therein. However, this reaction is in fact an in situ process for the formation of phosphorus pentachloride which reacts with the phosphorus pentoxide. Thus, careful control must be exercised. Also, this is a batch process since it is essential to manufacture phosphorus pentoxide in a separate plant and combine the same with phosphorus trichloride and chlorine gases, thus requiring a separate plant operation.

BRIEF DESCRIPTION OF THE INVENTION

It has been discovered that phosphorus oxychloride can be manufactured in a continuous manner by introducing phosphorus trichloride into a reaction vessel along with phosphorus and an oxygen doning material such as air. Thus, phosphorus in stoichiometric excess of that required to produce the phosphorus pentoxide required to produce phosphorus oxychloride is added to phosphorus trichloride. Dried air is simultaneously introduced into the phosphorus trichloride phosphorus mixture until the phosphorus is completely oxidized to phosphorus pentoxide. The mixture of phosphorus trichloride and phosphorus pentoxide is then continuously conveyed to a second reaction vessel wherein chlorine is added to produce the phosphorus oxychloride. This will eliminate the need for a separate plant for the manufacture of phosphorus pentoxide as heretobefore experienced in the prior art.

BRIEF DESCRIPTION OF THE DRAWINGS

The single FIGURE is a schematic illustration of the process of the present invention.

DETAILED DESCRIPTION OF THE INVENTION

In the practice of the present invention, phosphorus trichloride is introduced into a packed tower 3 at inlet 2. The liquid phosphorus trichloride is conveyed to a reaction chamber 1 through a line 2'. Thereafter, liquid phosphorus and an oxygen doning material, air being the preferred embodiment, are introduced into the reaction chamber 1 at inlets 4 and 5, respectively. It should be noted that an excess of air must be introduced into the reaction chamber to oxidize the phosphorus to phosphorus pentoxide, the oxygen in the air should be in excess of that stoichiometrically required to produce the phosphorus pentoxide from the phosphorus being introduced. In the event that sufficient air is not introduced into the reaction chamber 1, lower oxides of phosphorus will be formed which is undesirable and would contaminate the reaction product and cause loss of yield of phosphorus.

Since the oxidation of phosphorus to phosphorus pentoxide is exothermic, the heat of vaporization causes a partial vaporization of the phosphorus trichloride. The phosphorus trichloride vapors are conveyed to the packed tower 3 via pipe 3'. These vapors are then conveyed to a condenser 7 by line 6. Also entrained within the phosphorus trichloride vapor will be a nitrogen rich air since the nitrogen is inert to the reaction involved. The condensed products are reconveyed to the packed tower 3 by pipe 8 while the nitrogen rich air is released to the atmosphere as indicated at 9.

Thus, a mixture of phosphorus trichloride and phosphorus pentoxide is removed from the reaction chamber 1 by line 10 and conveyed to a second reaction vessel 11. In the reaction vessel 11, gaseous chlorine is introduced therein at 12. The reaction within vessel 11 forms phosphorus oxychloride. Since the reaction of chlorine with the mixture of phosphorus trichloride and phosphorus pentoxide is exothermic, vaporized phosphorus trichloride and phosphorus oxychloride are conveyed to a packed tower 13 by pipe 11'.

From the packed tower 13, the mixture of vaporized phosphorus trichloride and phosphorus oxychloride are conveyed to a condenser 14 by line 16. The condenser 14 condenses the mixture of materials which are conveyed to a fractionating tower 17 indicated at 18. It is noted that part of the condensed materials are reconveyed to the tower 13 by pipe 15 to aid in dissipating the heat of reaction within the vessel 11.

Within the fractionating tower 17 the phosphorus oxychloride is separated from the phosphorus trichloride in the conventional manner. Thus, the vaporized phosphorus trichloride is reconveyed to the reaction chamber 11 by pipe 20. The liquid phosphorus oxychloride is conveyed to a condenser or cooling medium 22 by pipe 21 and then collected as indicated by 23.

It should be noted that essentially all of the phosphorus introduced into the reaction chamber 1 is converted to phosphorus pentoxide because there is an excess of oxygen introduced through line 5. In the event that some of the phosphorus is vaporized and passes into the packed tower 3 along with the other gases through line 3', the oxygen present within the vapor will scavenge the phosphorus and it will be collected within the condenser 7 and returned to the system.

The following example is given to set out how the method may be carried out, but it is to be expressly understood that it should not restrict the process of the present invention.

EXAMPLE 1

Phosphorus trichloride is introduced into a reactor at the rate of 1,074.6 pounds per hour. The reactor is equipped with a packed tower and a condenser and is provided with an inventory of 500 gallons of phosphorus trichloride. Phosphorus and air are introduced simultaneously at a rate of 161.6 pounds of phosphorus per hour and 1200 pounds per hour of dried air. The air is introduced through a sparging aspirator. The phosphorus and oxygen within the air reacted together to form phosphorous pentoxide in situ and is intermixed with the phosphorus trichloride. The mixture of phosphorus pentoxide and phosphorus trichloride is pumped at the rate of 1445.2 pounds per hour into a second reactor containing an inventory of 500 gallons of phosphorus oxychloride. The second reactor is equipped with a fractionating tower and a condenser. Chlorine is added to the second reactor at the rate of 554.8 pounds per hour. The components within this second reactor form phosphorus oxychloride as the end product. The phosphorus oxychloride so produced is recovered at a rate of 2,000 pounds per hour.

What is claimed:

1. A continuous process for producing phosphorus oxychloride, comprising the steps of:
   a. providing liquid phosphorus trichloride in a first reaction zone;
   b. introducing phosphorus and air into said first reaction zone to form phosphorus pentoxide in the presence of said phosphorus trichloride; and
   c. passing the phosphorus pentoxide and phosphorus trichloride mixture from the first reaction zone to a second reaction zone, and reacting the mixture with chlorine fed into said second reaction zone to form phosphorus oxychloride.

2. The continuous process of claim 1, wherein said air is introduced to said first reaction zone in an excess.

3. The continuous process of claim 1, wherein said first reaction zone has an inventory of phosphorus trichloride.

4. The continuous process of claim 1, wherein said second reaction zone has an inventory of phosphorus oxychloride.

5. A continuous process for producing phosphorus oxychloride, comprising the steps of:
   a. providing liquid phosphorus trichloride in a first reaction zone;
   b. introducing phosphorus and air into said first reaction zone and maintaining the resultant mixture under conditions to produce a reaction product comprising phosphorus pentoxide and a vaporous material containing phosphorus trichloride;
   c. passing at least a portion of said vaporous material to a condensation zone to condense phosphorus trichloride therefrom and returning at least a portion of said condensed phosphorus trichloride to said first reaction zone; and
   d. passing phosphorus pentoxide and phosphorus trichloride from the first reaction zone to a second reaction zone, and reacting the mixture with chlorine fed into said second reaction zone to form phosphorus oxychloride.

6. The continuous process of claim 5, wherein said air is introduced to said first reaction zone in an excess.

7. The continuous process of claim 5, wherein said first reaction zone has an inventory of phosphorus trichloride.

8. The process of claim 1, wherein said second reaction zone has an inventory of phosphorus oxychloride.

* * * * *